United States Patent
Kuhl

(10) Patent No.: US 8,225,014 B2
(45) Date of Patent: Jul. 17, 2012

(54) CONTINUOUS DATA PROVISION BY RADIO FREQUENCY IDENTIFICATION (RFID) TRANSPONDERS

(75) Inventor: Carmen Kuhl, Dortmund (DE)

(73) Assignee: Nokia Corporation, Espoo (FI)

(*) Notice: Subject to any disclaimer, the term of this patent is extended or adjusted under 35 U.S.C. 154(b) by 941 days.

(21) Appl. No.: 10/592,739

(22) PCT Filed: Mar. 17, 2004

(86) PCT No.: PCT/IB2004/000784
§ 371 (c)(1),
(2), (4) Date: Jun. 2, 2008

(87) PCT Pub. No.: WO2005/093643
PCT Pub. Date: Oct. 6, 2005

(65) Prior Publication Data
US 2008/0231428 A1    Sep. 25, 2008

(51) Int. Cl.
*G06F 3/00* (2006.01)
(52) U.S. Cl. ............................. 710/52; 710/74
(58) Field of Classification Search .................. None
See application file for complete search history.

(56) References Cited

U.S. PATENT DOCUMENTS

| | | |
|---|---|---|
| 4,599,490 A | 7/1986 | Cornell et al. |
| 4,698,781 A | 10/1987 | Cockerell, Jr. |
| 4,821,309 A | 4/1989 | Namekawa |
| 5,138,329 A | 8/1992 | Saarnimo et al. |
| 5,345,596 A | 9/1994 | Buchenhorner et al. |
| 5,497,140 A | 3/1996 | Tuttle et al. |
| 5,525,994 A * | 6/1996 | Hurta et al. ............. 342/51 |
| 5,577,266 A | 11/1996 | Takahisa et al. |
| 5,625,669 A | 4/1997 | McGregor et al. |
| 5,627,517 A | 5/1997 | Theimer et al. |

(Continued)

FOREIGN PATENT DOCUMENTS

CN     1027611 C     2/1995

(Continued)

OTHER PUBLICATIONS

Inoue et al, "A Ferroelecrtric Memory Embedded in a RFID Transponder with 2.4V Operation and 10 Year Retention at 70° C," 1997, IEEE, pp. 290-291.*

(Continued)

*Primary Examiner* — Chun-Kuan Lee
*Assistant Examiner* — Dayton Lewis-Taylor
(74) *Attorney, Agent, or Firm* — Hollingsworth & Funk, LLC

(57) ABSTRACT

The present invention relates to the field of short-rage communication systems. In particular, the present invention relates to radio frequency identification transponders with fixed physical memory capacity having however a flexible virtual memory capacity allowing for providing amounts of data by the radio frequency identification transponders extending the fixed physical memory capacity. Accordingly, a method and a radio frequency identification transponder for continuos data provision by a radio frequency identification transponder is provided. A stream of data is received via a data interface for the transponder and the received data is stored in a transponder memory. Then the stored data is read out form the transponder memory and supplied to a radio frequency interface for being communicated therewith. Next, the memory, which is currently used for storing data, which has been read out previously, is provided afterwards for storing data being received subsequently via the data interface.

17 Claims, 5 Drawing Sheets

U.S. PATENT DOCUMENTS

| | | | |
|---|---|---|---|
| 5,729,594 | A | 3/1998 | Klingman et al. |
| 5,815,811 | A | 9/1998 | Pinard et al. |
| 5,887,253 | A | 3/1999 | O'Neil et al. |
| 5,898,679 | A | 4/1999 | Brederveld et al. |
| 5,903,830 | A | 5/1999 | Joao et al. |
| 5,917,865 | A | 6/1999 | Kopmeiners et al. |
| 5,917,913 | A | 6/1999 | Wang |
| 5,943,624 | A | 8/1999 | Fox |
| 6,002,984 | A | 12/1999 | Aughenbaugh |
| 6,011,976 | A | 1/2000 | Michaels et al. |
| 6,025,780 | A | 2/2000 | Bowers et al. |
| 6,101,375 | A | 8/2000 | Tuttle et al. |
| 6,104,290 | A | 8/2000 | Naguleswaran |
| 6,104,333 | A | 8/2000 | Wood, Jr. |
| 6,115,782 | A * | 9/2000 | Wolczko et al. ............... 711/100 |
| 6,130,623 | A | 10/2000 | Maclellan |
| 6,144,847 | A | 11/2000 | Atschul et al. |
| 6,144,848 | A | 11/2000 | Walsh et al. |
| 6,167,514 | A | 12/2000 | Matsui et al. |
| 6,175,860 | B1 | 1/2001 | Gaucher |
| 6,175,922 | B1 | 1/2001 | Wang |
| 6,236,186 | B1 | 5/2001 | Helton et al. |
| 6,282,407 | B1 | 8/2001 | Vega et al. |
| 6,297,737 | B1 | 10/2001 | Irvin |
| 6,337,856 | B1 | 1/2002 | Schanhals et al. |
| 6,382,507 | B2 | 5/2002 | Schilling |
| 6,404,339 | B1 | 6/2002 | Eberhardt |
| 6,422,462 | B1 | 7/2002 | Cohen |
| 6,424,623 | B1 | 7/2002 | Borgstahl et al. |
| 6,424,706 | B1 | 7/2002 | Katz et al. |
| 6,434,159 | B1 | 8/2002 | Woodward et al. |
| 6,445,732 | B1 | 9/2002 | Beamish et al. |
| 6,456,039 | B1 | 9/2002 | Lauper et al. |
| 6,456,234 | B1 | 9/2002 | Johnson |
| 6,462,647 | B1 | 10/2002 | Roz |
| 6,483,106 | B1 | 11/2002 | Ohtomo et al. |
| 6,487,180 | B1 | 11/2002 | Borgstahl et al. |
| 6,488,209 | B1 | 12/2002 | Hunt et al. |
| 6,501,741 | B1 | 12/2002 | Mikkonen et al. |
| 6,512,919 | B2 | 1/2003 | Ogasawara |
| 6,539,422 | B1 | 3/2003 | Hunt et al. |
| 6,542,721 | B2 | 4/2003 | Boesen |
| 6,566,997 | B1 | 5/2003 | Bradin |
| 6,634,560 | B1 | 10/2003 | Grabau |
| 6,663,063 | B2 | 12/2003 | Tatta |
| 6,677,852 | B1 | 1/2004 | Landt |
| 6,681,120 | B1 | 1/2004 | Kim |
| 6,687,679 | B1 | 2/2004 | Van Luchene et al. |
| 6,690,402 | B1 | 2/2004 | Waller et al. |
| 6,697,375 | B1 | 2/2004 | Meng |
| 6,705,520 | B1 | 3/2004 | Pitroda et al. |
| 6,710,576 | B1 | 3/2004 | Kaufman et al. |
| 6,732,176 | B1 | 5/2004 | Stewart et al. |
| 6,783,071 | B2 | 8/2004 | Levine et al. |
| 6,832,082 | B1 | 12/2004 | Ramaswamy et al. |
| 6,842,621 | B2 | 1/2005 | Labun et al. |
| 6,859,650 | B1 | 2/2005 | Ritter |
| 6,892,052 | B2 | 5/2005 | Kotola et al. |
| 6,892,082 | B2 | 5/2005 | Boesen |
| 6,989,741 | B2 | 1/2006 | Kenny et al. |
| 7,020,474 | B2 | 3/2006 | Scott |
| 7,039,600 | B1 | 5/2006 | Meek et al. |
| 7,049,963 | B2 | 5/2006 | Waterhouse et al. |
| 7,098,770 | B2 | 8/2006 | Charrat et al. |
| 7,152,040 | B1 | 12/2006 | Hawthorne et al. |
| 7,174,564 | B1 | 2/2007 | Weatherspoon et al. |
| 7,190,257 | B2 * | 3/2007 | Maltseff et al. ............ 340/10.51 |
| 7,231,372 | B1 | 6/2007 | Prange et al. |
| 7,433,677 | B2 | 10/2008 | Kantola et al. |
| 7,657,490 | B1 | 2/2010 | Nakajima et al. |
| 2001/0007815 | A1 | 7/2001 | Philipsson |
| 2002/0011519 | A1 | 1/2002 | Shults |
| 2002/0020743 | A1 | 2/2002 | Sugukawa et al. |
| 2002/0022483 | A1 | 2/2002 | Thompson et al. |
| 2002/0022504 | A1 | 2/2002 | Hori |
| 2002/0023215 | A1 | 2/2002 | Wang et al. |
| 2002/0026586 | A1 | 2/2002 | Ito |
| 2002/0065065 | A1 | 5/2002 | Lunsford et al. |
| 2002/0106988 | A1 | 8/2002 | Davie et al. |
| 2002/0107742 | A1 | 8/2002 | Magill |
| 2002/0126845 | A1 | 9/2002 | Hue et al. |
| 2002/0145039 | A1 | 10/2002 | Carroll |
| 2002/0154607 | A1 | 10/2002 | Forstadius et al. |
| 2002/0164994 | A1 * | 11/2002 | Lundberg ..................... 455/456 |
| 2002/0170961 | A1 | 11/2002 | Dickson et al. |
| 2002/0188863 | A1 | 12/2002 | Friedman |
| 2003/0008647 | A1 | 1/2003 | Takatori et al. |
| 2003/0030542 | A1 | 2/2003 | Von Hoffmann |
| 2003/0051767 | A1 | 3/2003 | Coccaro et al. |
| 2003/0051945 | A1 | 3/2003 | Coccaro et al. |
| 2003/0055735 | A1 | 3/2003 | Cameron et al. |
| 2003/0093187 | A1 | 5/2003 | Walker |
| 2003/0114104 | A1 | 6/2003 | Want et al. |
| 2003/0141989 | A1 | 7/2003 | Arisawa et al. |
| 2003/0146821 | A1 | 8/2003 | Brandt |
| 2003/0148775 | A1 | 8/2003 | Spriestersbach et al. |
| 2004/0002305 | A1 | 1/2004 | Byman-Kivivuori et al. |
| 2004/0012531 | A1 | 1/2004 | Toda |
| 2004/0039661 | A1 | 2/2004 | Fuzell-Casey et al. |
| 2004/0099738 | A1 | 5/2004 | Waters |
| 2004/0164166 | A1 | 8/2004 | Mahany et al. |
| 2004/0203376 | A1 | 10/2004 | Phillipps |
| 2005/0017068 | A1 | 1/2005 | Zalewski et al. |
| 2005/0026635 | A2 | 2/2005 | Michaels et al. |
| 2005/0034029 | A1 | 2/2005 | Ramberg et al. |
| 2005/0037707 | A1 | 2/2005 | Lewis |
| 2005/0040951 | A1 | 2/2005 | Zalewski et al. |
| 2005/0077356 | A1 | 4/2005 | Takayama et al. |
| 2005/0079817 | A1 | 4/2005 | Kotola et al. |
| 2005/0134461 | A1 | 6/2005 | Gelbman et al. |
| 2005/0136949 | A1 | 6/2005 | Barnes, Jr. |
| 2005/0218230 | A1 | 10/2005 | Amtmann et al. |
| 2005/0237843 | A1 | 10/2005 | Hyde |
| 2005/0269411 | A1 | 12/2005 | Vesikivi et al. |
| 2006/0132310 | A1 | 6/2006 | Cox et al. |
| 2006/0145865 | A1 | 7/2006 | Forster |
| 2006/0168644 | A1 | 7/2006 | Richter et al. |
| 2006/0244592 | A1 | 11/2006 | Kansala et al. |
| 2006/0280149 | A1 | 12/2006 | Kuhl |
| 2007/0063816 | A1 | 3/2007 | Murakami et al. |
| 2007/0236350 | A1 | 10/2007 | Nystrom et al. |
| 2008/0057867 | A1 | 3/2008 | Trappeniers et al. |
| 2008/0231428 | A1 | 9/2008 | Kuhl |
| 2008/0238617 | A1 | 10/2008 | Kuhl et al. |
| 2009/0058618 | A1 | 3/2009 | Gopalan et al. |

FOREIGN PATENT DOCUMENTS

| | | |
|---|---|---|
| EP | 0780802 | 6/1997 |
| EP | 0926623 | 6/1999 |
| EP | 1178445 | 2/2002 |
| EP | 1182833 | 2/2002 |
| EP | DE10042805 | 3/2002 |
| EP | 1330075 | 9/2002 |
| EP | 1012793 | 4/2003 |
| EP | 1545069 | 6/2005 |
| EP | 1633104 | 8/2006 |
| EP | 1522955 | 8/2008 |
| EP | 1725977 | 4/2009 |
| GB | 2308947 A | 9/1997 |
| GB | 2342010 | 3/2000 |
| JP | 09172409 | 6/1997 |
| JP | 2002063652 | 2/2002 |
| JP | 2002271850 | 9/2002 |
| JP | 2005218127 | 8/2005 |
| JP | 2006525580 | 11/2006 |
| WO | WO9300750 | 1/1993 |
| WO | WO9806214 | 2/1998 |
| WO | WO9858510 | 12/1998 |
| WO | WO9905659 | 2/1999 |
| WO | WO0065747 | 11/2000 |
| WO | WO0103311 | 1/2001 |
| WO | WO0139103 | 5/2001 |
| WO | WO0139108 | 5/2001 |
| WO | WO0145038 | 6/2001 |
| WO | WO0145319 | 6/2001 |
| WO | WO0180193 | 10/2001 |
| WO | WO0203625 | 1/2002 |

| | | |
|---|---|---|
| WO | WO02071325 | 9/2002 |
| WO | WO02099715 | 12/2002 |
| WO | WO03007623 | 1/2003 |
| WO | WO03025834 | 3/2003 |
| WO | WO03079281 | 9/2003 |
| WO | WO03081519 | 10/2003 |
| WO | WO03081787 | 10/2003 |
| WO | WO2004098089 | 11/2004 |
| WO | WO2004110017 | 12/2004 |
| WO | WO2008024531 | 2/2008 |

OTHER PUBLICATIONS

File History for U.S. Appl. No. 10/586,771 as retrieved from U.S. Patent and Trademark Office on Mar. 30, 2011, 272 pages.
File History for U.S. Appl. No. 10/565,260 as retrieved from U.S. Patent and Trademark Office on Mar. 30, 2011, 171 pages.
File History for U.S. Appl. No. 10/592,811 as retrieved from U.S. Patent and Trademark Office on Mar. 30, 2011, 110 pages.
File History for EP Application No. 05725885.7 as retrieved from European Patent Office Electronic File System on Mar. 30, 2011, 206 pages.
The International Preliminary Report on Patentability dated Sep. 20, 2006 from related PCT Application No. PCT/IB2004/000784, 4pgs.
File History for U.S. Appl. No. 10/565,260 as retrieved from U.S. Patent and Trademark Office on Aug. 16, 2011, 177 pages.
File History for U.S. Appl. No. 10/592,811 as retrieved from U.S. Patent and Trademark Office on Aug. 16, 2011, 142 pages.
Office Action with translation dated Jun. 30, 2011 from Chinese Application No. 038069717, 6 pages.
The European Office Action dated Jun. 17, 2008 from parallel European Application No. 04721251.9, 4 pages.
The Chinese Office Action and English translation dated Jun. 20, 2008 from parallel Chinese Application No. 200480042848.5, 9 pages.
The Chinese Office Action and English translation dated Dec. 12, 2008 from parallel Chinese Application No. 200480042848.5, 6 pages.
Standard ECMA-340, Near Field Communication—Interface and Protocol (NFCIP-1), XP002290360, Dec. 2002.
Haselsteiner et al., "Security in Near Field Communication (NFC)", http://events.iaik.tugraz.atlRFIDSec06/Program/papers/002%20-%020Security%20in%20NFC.pdf, downloaded from web Jul. 22, 2010.
European Extended Search Report dated Jan. 19, 2010 from European Patent Application No. 09164761.0, pp. 1-7.
European Office Action dated Dec. 13, 2007 from European Patent Application No. 04721251.9, pp. 1-4.
European Office Action dated May 18, 2006 from European Patent Application No. 03817515.4, pp. 1-4.
European Office Action dated Sep. 20, 2006 from European Patent Application No. 03817515.4, pp. 1-3.
European Office Action dated Mar. 6, 2007 from European Patent Application No. 03817515.4, pp. 1-3.
European Office Action dated Dec. 21, 2007 from European Patent Application No. 03817515.4, pp. 1-5.
European Office Action dated Sep. 9, 2008 from European Patent Application No. 03817515.4, pp. 1-3.
European Search Report dated Jan. 30, 2007 from European Patent Application No. 03744931.1, pp. 1-3.
European Office Action dated Oct. 12, 2007 from European Patent Application No. 03744931.1, pp. 1-8.
European Office Action dated Oct. 21, 2009 from European Patent Application No. 03744931.1, pp. 1-6.
European Supplemental Search Report dated Feb. 20, 2008 from European Patent Application No. 05725885.7, pp. 1-3.
European Office Action dated Oct. 21, 2009 from European Patent Application No. 05725885.7, pp. 1-8.
European Office Action dated Oct. 10, 2008 from European Patent Application No. 01927886.0, pp. 1-4.
Chinese Office Action dated Jul. 20, 2007 from Chinese Patent Application No. 03826782.9, pp. 1-18.
Chinese Office Action dated Mar. 21, 2008 from Chinese Patent Application No. 03826782.9, pp. 1-16.
Chinese Final Office Action dated Jul. 4, 2008 from Chinese Patent Application No. 03826782.9, pp. 1-16.
Chinese Office Action dated Mar. 20, 2009 from Chinese Patent Application No. 03826782.9, pp. 1-6.
Chinese Office Action dated Mar. 30, 2007 from Chinese Patent Application No. 03806971.7, pp. 1-17.
Chinese Office Action dated Dec. 28, 2007 from Chinese Patent Application No. 03806971.7, pp. 1-5.
Chinese Office Action dated Aug. 8, 2008 from Chinese Patent Application No. 03806971.7, pp. 1-8.
Chinese Office Action dated Jul. 31, 2009 from Chinese Patent Application No. 03806971.7, pp. 1-9.
Chinese Office Action dated Apr. 16, 2004 from Chinese Patent Application No. 01117943.0, pp. 1-9.
Chinese Office Action dated Jun. 17, 2005 from Chinese Patent Application No. 01117943.0, pp. 1-9.
Korean Office Action dated Jun. 25, 2007 from Korean Patent Application No. 10-2006-7017374, pp. 1-2.
Korean Office Action dated Jan. 15, 2008 from Korean Patent Application No. 1 0-2006-7017374, pp. 1-5.
Korean Office Action dated Dec. 15, 2006 from Korean Patent Application No. 10-2006-7001417, pp. 1-7.
Great Britain Search Report dated Nov. 17, 2000 from British Application No. 0010983.5, pp. 1-3.
Great Britain Office Action dated Aug. 7, 2003 from British Application No. 0010983.5, pp. 1-2.
Great Britain Search Report dated Nov. 20, 2000 from British Application No. 0010982.7, pp. 1-2.
Great Britain Office Action dated Sep. 23, 2003 from British Patent Application No. 0010982.7, pp. 1-2.
Japanese Office Action dated May 7, 2008 from Japanese Patent Application No. 2005-504352, pp. 1-6.
Japanese Final Office Action dated Nov. 11, 2008 from Japanese Patent Application No. 2005-504352, pp. 1-6.
Japanese Office Action dated Jun. 16, 2008 from Japanese Patent Application No. 2003-579374, pp. 1-3.
Japanese Final Office Action dated Jun. 1, 2009 from Japanese Patent Application No. 2003-579374, pp. 1-3.
International Search Report and Written Opinion dated Oct. 22, 2004 from Patent Cooperation Treaty Application No. PCT/IB2004/000784, pp. 1-4.
International Preliminary Report on Patentability dated Jun. 27, 2005 from Patent Cooperation Treaty Application No. PCT/IB2003/002900, pp. 1-11.
International Search Report dated Feb. 11, 2004 from Patent Cooperation Treaty Application No. PCT/IB2003/002900, pp. 1-3.
International Search Report and Written Opinion dated Aug. 11, 2006 from Patent Cooperation Treaty Application No. PCT/US05/09066, pp. 1-13.
International Invitation to Pay Additional Search Fees dated Apr. 24, 2006 from Patent Cooperation Treaty Application No. PCT/US05/09066, pp. 1-2.
International Search Report dated Oct. 17, 2003 from Patent Cooperation Treaty Application No. PCT/IB03/00897, pp. 1-3.
International Search Report dated Nov. 9, 2001 from Patent Cooperation Treaty Application No. PCT/EP01/03950, pp. 1-6.
International Preliminary Examination Report dated Sep. 23, 2002 from Patent Cooperation Treaty Application No. PCT/EP01/03950, pp. 1-10.
Written Opinion dated Apr. 8, 2002 from Patent Cooperation Treaty Application No. PCT/EP01/03950, pp. 1-3.
Detailed Written Opinion dated Jul. 16, 2002 from Patent Cooperation Treaty Application No. PCT/EP01/03950, pp. 1-6.
U.S. File History for U.S. Appl. No. 10/565,260 retrieved from U.S. Patent and Trademark Office on Aug. 25, 2010, pp. 1-130.
U.S. File History for U.S. Appl. No. 09/848,515 retrieved from U.S. Patent and Trademark Office on Aug. 25, 2010, pp. 1-484.
U.S. File History for U.S. Appl. No. 12/196,408 retrieved from U.S. Patent and Trademark Office on Aug. 25, 2010, pp. 1-182.
U.S. File History for U.S. Appl. No. 10/105,320 retrieved from U.S. Patent and Trademark Office on Aug. 25, 2010, pp. 1-373.
U.S. File History for U.S. Appl. No. 10/804,081 retrieved from U.S. Patent and Trademark Office on Aug. 25, 2010, pp. 1-538.

U.S. File History for U.S. Appl. No. 09/848,459 retrieved from U.S. Patent and Trademark Office on Aug. 25, 2010, pp. 1-245.
Office Action with translation dated Oct. 27, 2011 from Korean Application No. 10-2010-0064969, 5 pages.
Office Action dated Oct. 20, 2011 from Japanese Application No. 2009-229506, 4 pages.
File History for U.S. Appl. No. 10/565,260 as retrieved from U.S. Patent and Trademark Office on Feb. 16, 2012, 218 pages.
File History for U.S. Appl. No. 10/592,811 as retrieved from U.S. Patent and Trademark Office on Feb. 16, 2012, 181 pages.
Office Action dated Jun. 27, 2011 from Canadian Application No. 2,533,029, 3 pages.
Zdravkovic, "Wireless point of sale terminal for credit and debit payment systems", Conference on Electrical and Computer Engineering, May 24-28, 1998.
Bisdikian, "An Overview of the Bluetooth Wireless Technology", IEEE Communications Magazine, Dec. 2001, pp. 86-94.
"Bluetooth measurements in CMU200", Universal Radio Communication Tester CMU200, 4 pages.

* cited by examiner

State of the Art

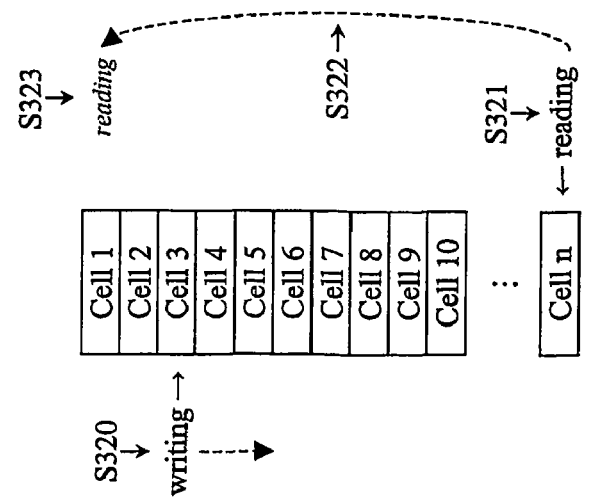
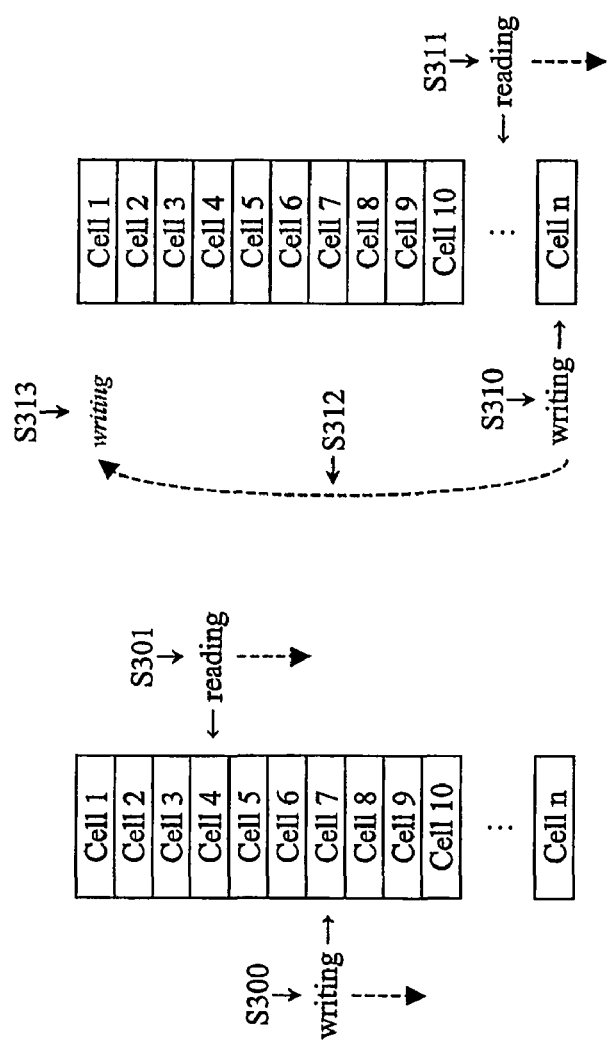
Fig. 4e
Fig. 4d
Fig. 4c

CONTINUOUS DATA PROVISION BY RADIO FREQUENCY IDENTIFICATION (RFID) TRANSPONDERS

FIELD OF THE INVENTION

The present invention relates to the field of short-rage communication systems. In particular, the present invention relates to radio frequency identification transponders with fixed physical memory capacity having however a flexible virtual memory capacity allowing for providing amounts of data by the radio frequency identification transponders extending the fixed physical memory capacity.

BACKGROUND

Radio frequency identification (RFID) technology relates basically to the field of local communication technology and more particularly local communication technology involving electromagnetic and/or electrostatic coupling technology. Electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency identification (RFID) tags and reader devices for radio frequency identification (RFID) transponders also denoted for simplicity as radio frequency identification (RFID) readers.

Originally, radio frequency identification (RFID) technology has been developed and introduced for electronic article surveillance, article management purposes and logistics primarily for replacing bar code identification labels which are used for article management purposes and logistics up to now. A typical implementation of a state of the art radio frequency identification (RFID) transponder is shown with respect to FIG. 1. A typical radio frequency identification (RFID) transponder module 10 includes conventionally an electronic circuit, depicted exemplary as transponder logic 11, with data storage capacity, depicted herein as transponder memory 12, and a radio frequency (RF) interface, which couples an antenna 13 to the transponder logic 11. Herein the radio frequency (RF) interface is not explicitly depicted, rather the radio frequency (RF) interface is integrated into the transponder logic 11. The radio frequency identification (RFID) transponders are typically accommodated in small containers. In dependence on the requirements made on envisaged applications of the radio frequency identification (RFID) transponders (i.e. the data transmission rate, energy of the interrogation, transmission range etc), different types are provided for data/information transmission at different radio frequencies within a range from several 10-100 kHz to some GHz (e.g. 134 kHz, 13.56 MHz, 860-928 MHz etc; only for illustration). Two main classes of radio frequency identification (RFID) transponders can be distinguished. Passive radio frequency identification (RFID) transponders are activated and energized by radio frequency identification (RFID) readers, which generate an interrogation signal, for example a radio frequency (RF) signal at a certain frequency. Active radio frequency identification (RFID) transponders comprise own power supplies such as batteries or accumulators for energizing.

On activation of a radio frequency identification (RFID) transponder by a radio frequency identification (RFID) reader, the informational contents stored in the transponder memory 12 are modulated onto a radio frequency (RF) signal, which is emitted by the antenna 13 of the radio frequency identification (RFID) transponder to be detected and received by the radio frequency identification (RFID) reader. Typical state of the art radio frequency identification (RFID) transponders correspond to radio frequency identification (RFID) standards such as the ISO 14443 type A standard or the Mifare standard. In accordance with the application purpose of a radio frequency identification (RFID) transponder, the data stored in the transponder memory may be either hard-coded or soft-coded. Hard-coded means that the data stored in the transponder memory 13 is predetermined and unmodifiable. Soft-coded means that the data stored in the transponder memory 13 is configurable by an external entity. The configuration of the transponder memory may be performed by a radio frequency (RF) signal via the antenna 13 and the radio frequency (RF) interface or may be performed via a configuration interface, which allows for direct connection with the transponder memory 13. Nevertheless, the informational content size and the amount of data stored by the transponder memory 13 is limited by the physical implementation limitations of the transponder memory, respectively, i.e. by the capacity of the transponder memory 13 representing a fixed maximal capacity limit.

Indeed, conventional state of the art radio frequency identification (RFID) transponders, in particular passive radio frequency identification (RFID) transponders, can be systematically considered as wireless connectable storage media, which allow for reading data stored therein and which allow eventually for configuring the stored data by a kind of writing access.

Early during the stage of development of the radio frequency identification (RFID) technology it turned out that functionality of the radio frequency identification (RFID) technology can be adapted to further anticipated use cases mainly relating to wireless information communication in the field of portable consumer electronics (CE). Especially, configurable radio frequency identification (RFID) transponders enable to communicate data such as information relating to electronic calendar entries (vCal), information relating to electronic visiting cards (vCard), information relating to digital organizer directories, data relating to ring tones, data relating to digital pictures, file data, configuration information relating to wireless link establishment, like RFD-based Bluetooth link establishment and the like. Further, the radio frequency identification (RFID) transponders enable also for communicating information relating to electronic ticket applications, payment applications, access control applications etc. The aforementioned use cases and information contents to be communicated form only a non-limiting example list thereof. Further information contents, applications and use cases although not described, are possible.

Meanwhile, there exists a supplementary wireless communication standard called near-field communication (NFC), which is based on radio frequency identification (RFID) technology for data communication. In detail, the near-field communication (NFC) standard defines an active communication, in which NFC-enabled radio frequency identification (RFID) readers are adapted for communicating with each other by means of communication link and communication protocol being tailored to the capability and limitations of the employed radio frequency identification (RFID) technology. Although, the near-field communication (NFC) standard is based on employed radio frequency identification (RFID) technology, the near-field communication (NFC) standard is more likely comparable to typical bearer technologies known from various wireless communication technologies than to original radio frequency identification (RFID) technology, since near-field communication (NFC) employs a complex communication protocol stack and requires bi-directional active communication links. Both the complex communication protocol stack and the active communication link are power consuming, which is a main concern of portable consumer electronics (CE).

Conclusively, radio frequency identification (RFID) technology and near-field communication (NFC) being based thereon meet the increasing requirements and the needs of consumers for exchanging information and data wirelessly, which are partly driven by enhanced functionality of portable consumer electronics such as digital video players, digital music players, digital cameras, personal digital assistants (PDAs), mobile phones with camera functionality etc. According to general technology trends, it is reasonable to assume that the amount of data to be communicated and the data rates, at which data is transmitted, will increase.

Nevertheless, the existing developments in the field of radio frequency identification (RFID) technology are subjected to several disadvantages mentioned above. Available radio frequency identification (RFID) transponders albeit configurable are limited to a data capacity relating to both the data to be stored and the data to be communicated, which results from the limitation of data storage capacity within radio frequency identification (RFID) transponders. Near-field communication (NFC) being based on radio frequency identification (RFID) technology allows overcoming this capacity limitation but near-field communication (NFC) is a power consuming technology. However, power consumption is a main concern in the field of portable consumer electronics, which are energized by batteries or accumulators. That means that implementations of communication means on the basis of the near-field communication (NFC) standard contradict general design requirements of portable consumer electronics.

SUMMARY

It is an object of the present invention to overcome the physical capacity limitation of radio frequency identification (RFID) transponders while maintaining the advantageous of existing radio frequency identification (RFID) transponders, in particular moderate or less power consumption thereof.

The objects of the present invention are solved by a method, a radio frequency identification (RFID) transponder and a system as defined in the independent claims accompanying the present invention.

According to a first aspect of the present invention, a method for continues data provision in a radio frequency identification device is provided. A stream of data is received via a data interface and the received data is stored in a transponder memory. Subsequently, the stored data is read out form the transponder memory and supplied to a radio frequency interface for being communicated therewith. The transponder memory, which is used for storing that data, which has been read out previously, will be used for storing data, which is received subsequently via the data interface. This means, the transponder memory is preferably assigned for storing data, deleting them upon read-out and storing new data.

According to an embodiment of the present invention, the storing and the reading out operations mentioned above are substantially performed simultaneously or in continuously repeated alternation.

According to another embodiment of the present invention, the memory for storing the received data is allocated, i.e. at least partially allocated, and de-allocated, i.e. in turn at least partially, subsequent to the reading-out of the data stored.

According to yet another embodiment of the present invention, the transponder memory is partitioned into at least two memory areas. Firstly, one of the memory areas is applicable for storing the data and another one of the memory areas is applicable for reading-out the data. After having read-out the data from the memory area and/or used up the memory area for storing, the usage of the memory areas is altered.

According to a further embodiment of the present invention, the transponder memory is operable as buffer memory. For instance the transponder memory is operable as a first-in-first-out (FIFO) buffer memory, or a ring-buffer memory.

According to yet a further embodiment of the present invention, the reading out and supplying operations comprise reading out the data, which is stored in an allocated memory. The data to be read out is indicated by a reading position. The read-out data is supplied to the radio frequency interface and the memory, which comprises the read-out data indicated by the reading position, is at least partially de-allocated. Afterwards, the reading position is updated.

According to an additional embodiment of the present invention, the receiving and storing operations comprise receiving the stream of data via the data interface from an electronic device. A unused (i.e. not allocated or unallocated in the sense as described above with respect to the de-allocation of the memory area) memory indicated by a writing position is allocated for string data therein. The received data is written to the allocated memory area and the writing position is updated subsequently to allow further writing of data. The reading and writing positions differ from each other to prevent conflicts.

According to an embodiment of the present invention, the reading and writing positions are spaced by a predetermined offset.

According to an embodiment of the present invention, the read-out data is supplied to the radio frequency interface in a sequence, in which the data has been received previously via the data interface. The data sequence, which is observed at the data interface receiving the data a well-formed stream of data, is maintained at the transmission operable with the radio frequency interface.

According to a second aspect of the invention, computer program product for executing a method for continues data provision by a radio frequency identification transponder is provided. The computer program product comprises program code sections for carrying out the steps of the method according to an aforementioned embodiment of the invention, when the program is run on a controller, processor-based device, a computer, a terminal, a network device, a mobile terminal, or a mobile communication enabled terminal. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a third aspect of the invention, a computer program product is provided, which comprises program code sections stored on a machine-readable medium for carrying out the steps of the method according to an aforementioned embodiment of the invention, when the computer program product is run on a controller, processor-based device, a computer, a terminal, a network device, a mobile terminal, or a mobile communication enabled terminal.

According to a fourth aspect of the invention, a software tool is provided. The software tool comprises program portions for carrying out the operations of the aforementioned methods when the software tool is implemented in a computer program and/or executed According to a fifth aspect of the invention, a computer data signal embodied in a carrier wave and representing instructions is provided which when executed by a processor cause the steps of the method according to an aforementioned embodiment of the invention to be carried out.

According to a sixth aspect of the present invention, a radio frequency identification device with continuous data provision is provided. The radio frequency identification device comprises a data interface, a transponder memory, a radio frequency interface and a transponder logic. The data interface is operable with an electronic device and is adapted to receive data in form of a data stream from the electronic device. The received data is stored in the transponder memory. The transponder logic is capable to read out the stored data from the transponder memory and to supply the read-out data to the radio frequency interface, which performs the transmission of the supplied data, preferably via an antenna. The transponder memory, from which the data has been read-out previously, is used for storing the data, which is received subsequently via the data interface.

According to an embodiment of the present invention, the transponder memory is operable as a buffer memory.

According to another embodiment of the present invention, the transponder memory is partitioned into at least two memory areas. Firstly, one memory area of the at least two memory areas is applicable for storing the data received via the data interface. In addition, another memory area of the at least two memory areas is firstly applicable for reading out the data, which is previously stored therein, i.e. before the reading out. After having read-out the data from the memory area and/or used up the memory area for storing, the usage of the memory areas is altered.

According to yet another embodiment of the present invention, the transponder memory is adapted to allocate the memory for storing the data and to de-allocate the allocated memory subsequent to reading out the stored data.

According to a further embodiment of the present invention, the transponder logic is adapted to supply the read-out data in a same sequence to the radio frequency interface, which sequence is observable at the data interface, via which the data is received before.

According to yet a further embodiment of the present invention, the radio frequency identification device is a radio frequency identification transponder or a radio frequency identification module with radio frequency identification reader functionality as well as radio frequency identification transponder functionality.

According to a fourth aspect of the present invention, a system comprising a radio frequency identification device and an electronic device is provided. The radio frequency identification device is a radio frequency identification device according to an embodiment of the present invention and the electronic device is adapted to supply data to the radio frequency identification device. The radio frequency identification transponder is operable under control of the electronic device.

BRIEF DESCRIPTION OF THE DRAWINGS

In the following, the present invention will be described in greater detail with reference to embodiments and the accompanying drawings, in which

FIG. 4c to 4e illustrate schematically a structure and operativeness of a RFID transponder memory according to a third embodiment of the present invention:

DETAILED DESCRIPTION OF EMBODIMENTS OF THE INVENTION

Figure 1:
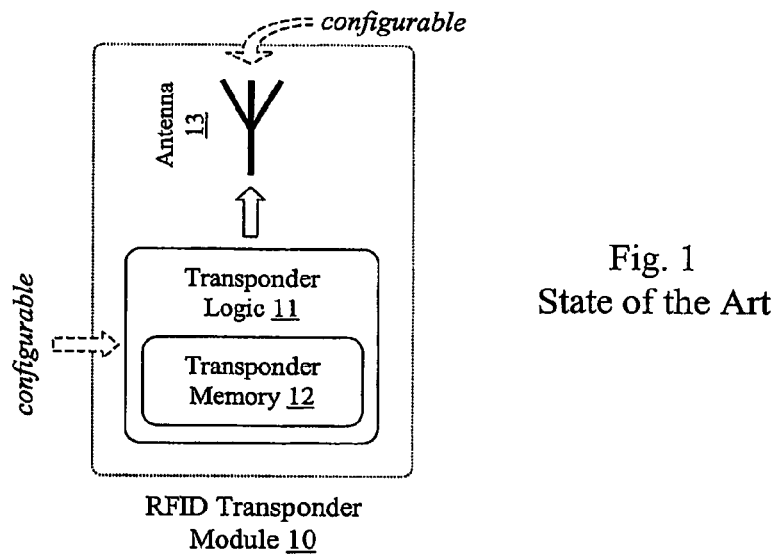
FIG. 1 shows schematically a typical internal structure of a state of the art RFID transponder.

Throughout the detailed description and the accompanying drawings same or similar components, units or devices will be referenced by same reference numerals for clarity purposes.

Figure 2A:
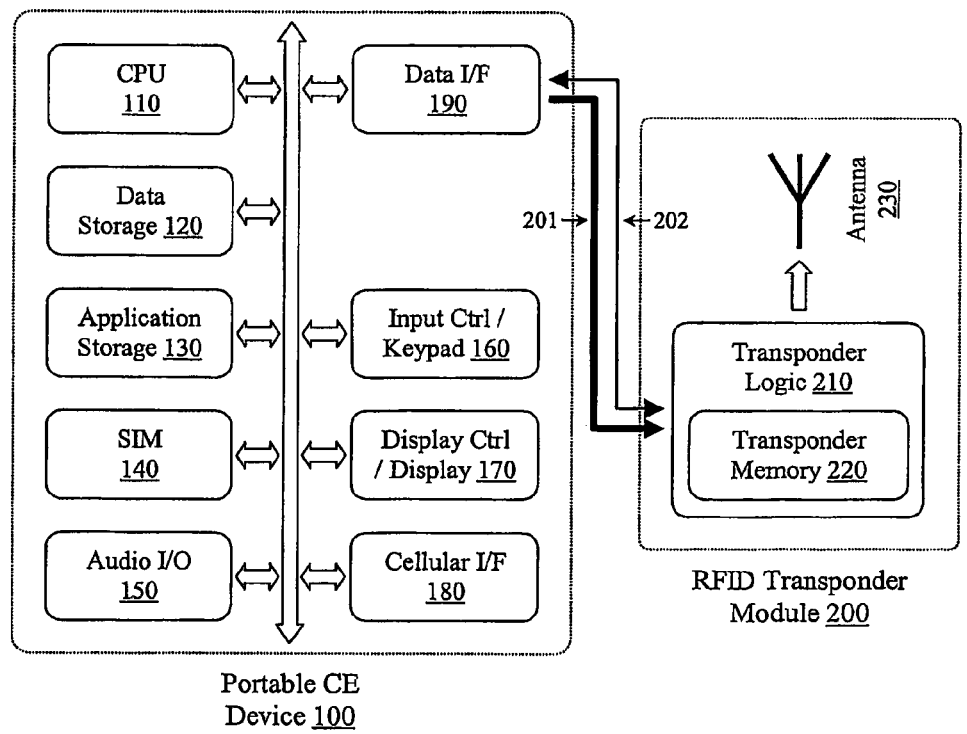
FIG. 2a illustrates schematically an implementation of a RFID transponder according to an embodiment of the present invention.
Figure 2B:
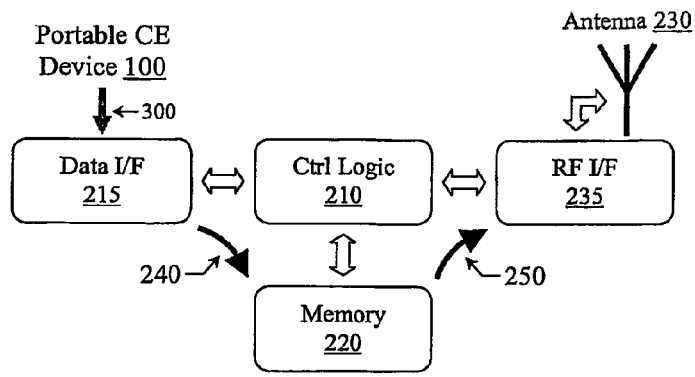
FIG. 2b illustrates schematically an implementation of the RFID transponder depicted in FIG. 2a according to an embodiment of the present invention.

FIG. 2a illustrates schematically an implementation of a portable consumer electronic (CE) device being equipped with a RFID transponder according to an embodiment of the present invention. FIG. 2b illustrates schematically an implementation of the RFID transponder of FIG. 2a in more detail. The description below refers to both FIG. 2a and FIG. 2b.

The block diagram of FIG. 2a illustrates a principle structure design of a cellular terminal, which should exemplary represent any kind of probable consumer electronic (CE) device 100 in the sense of the present invention. It shall be understood that the present invention is not limited to any specific kind of portable consumer electronic (CE) device. The illustrated cellular terminal comprises typically a central processing unit (CPU) 110, a data storage 120, an application storage 130, input/output means including audio input/output (I/O) means 150, a keypad with input controller (Ctrl) 160 and a display with display controller (Ctrl) 170. A cellular interface (I/F) 180 coupled to a cellular antenna (not shown) provides for an over-the-air interface, which serves in conjunction with a subscriber identification module (SIM) 140 for cellular communications with a corresponding radio access network (RAN) of a public land mobile network (PLMN).

The cellular interface (I/F) 180 is arranged as a cellular transceiver to receive signals from the cellular antenna, decodes the signals, demodulates them and also reduces them to the base band frequency. The output of the cellular interface (I/F) 180 thus consists of a stream of data that may require further processing by the central processing unit (CPU) 110. The cellular interface (I/F) 180 arranged as a cellular transceiver also receives data from the central processing unit (CPU) 110, which is to be transmitted via the over-the-air interface to the radio access network (RAN). Therefore, the cellular interface (I/F) 180 encodes, modulates and up converts the signal to the radio frequency, which is to be used. The cellular antenna then transmits the resulting radio frequency signal to the corresponding radio access network (RAN) of the public land mobile network (PLMN).

The display and display controller (Ctrl) 170 are controlled by the central processing unit (CPU) 110 and provides information for the user typically by the means of a user interface. The keypad and keypad controller (Ctrl) 160 are provided to allow the user to input information. The information input via the keypad is supplied to the central processing unit (CPU) 110, which may be controlled in accordance with the input information. The audio input/output (I/O) means 150 includes at least a speaker for reproducing an audio signal and a microphone for recording an audio signal. The central processing unit (CPU) 110 may control the conversion of audio data to audio output signals and the conversion of audio input signals into audio data, where the audio data has a suitable format for cellular transmission.

The radio frequency identification (RFID) transponder module 200 is operable with the aforementioned portable consumer electronic (CE) device embodied as cellular phone for the way of illustration. In principle, the illustrated radio frequency identification (RFID) transponder module 200 includes a transponder logic 210, which serves for the operation of the radio frequency identification (RFID) transponder module 200, a transponder memory 220 for storing data for being communicated via the radio frequency identification (RFID) transponder module 200 and an antenna 230. The transponder logic 210 is connected to the antenna 230 via a radio frequency (RF) interface 235, respectively, and the antenna 230 is adapted to the predetermined radio frequency/ frequencies deployed for operating.

The radio frequency (RF) interface 235 and antenna 230 are adequately adapted to receive one or more interrogation signals and to transmit one or more response signals carrying information retrieved from the transponder memory 220.

The antenna is connected to the radio frequency (RF) interface 235, which supplies RF signals generated by the radio frequency (RF) interface 235 to the antenna 230 and which accepts RF signals received by the antenna 230. The radio frequency (RF) interface 235 is responsible for both modulating and demodulating of the signals to be transmitted and received by the antenna 230, respectively.

The radio frequency (RF) interface 235 is typically capable to transmit demodulated signals to the transponder logic 210 and to receive signals from the transponder logic 210 to be modulated and transmitted. More particularly, the radio frequency (RF) interface 235 provides further signals necessary for the operation of the transponder logic 210, which are in detail a power supply signal (voltage signal) and a clock signal. The power supply signal is obtained from the coupling of the interrogating electromagnetic field into the antenna 230, whereas the clock signal is obtained from the demodulator comprised in the radio frequency (RF) interface 235. The power supply signal and the clock signal are obligate for operating the transponder logic 210, which is energized by interrogating signal emitted by an external interrogating entity, preferably, a RFID reader.

The transponder logic 210 is coupled to an interface, herein data interface (I/F) 215, which is coupled via connection 201 to allow reception of data from the portable consumer electronic device 100 having the corresponding data interface (I/F) 190. The data interface (I/F) 215 interfacing between reader logic 210 and the embodied cellular phone may be established by appropriate hardware and/or software interfaces.

The transponder memory 220 stores the data, which is retrievable by a corresponding radio frequency identification (RFID) reader. Accordingly, the transponder memory 220 is connected to transponder logic 210 and the transponder memory 220 is implemented as a configurable memory. Various storage technologies are available to implement a configurable memory and in particular non-volatile configurable storage technologies are applicable therefor. The configurable transponder memory 220 is under control of the transponder logic 210. Therefore, the transponder logic 210 is coupled via data interface (I/F) 215 to the data interface (I/F) 190 of the portable consumer electronic device 100. Data received by the transponder logic via data interface (I/F) is supplied to the transponder memory 220 to be at least temporary stored therein.

The illustrated radio frequency identification (RFID) transponder module 200 as embodied in FIG. 2*a* and FIG. 2*b* may be attached to or embedded in the portable consumer electronic device embodied herein as a cellular phone for the way of illustration. The radio frequency identification (RFID) transponder module 200 may be provided with a data interface (I/F) 215 such as a serial interface, a proprietary interface or any kind of known data interface, which is adapted to interface between the radio frequency identification (RFID) transponder module 200 and the embodied cellular phone having the data interface (I/F) 190, which corresponds to the data interface (I/F) 215. Applications executed on the embodied cellular phone can use the functionality of the radio frequency identification (RFID) transponder module 200. An application program interface (API) layer may support the communication between applications and the radio frequency identification (RFID) transponder module 200.

It shall be noted that the embodiment of the radio frequency identification (RFID) transponder module 200 shown in FIGS. 2*a* and 2*b* illustrates one possible embodiment thereof. The depicted (logic and memory) units shall represent functional units. Those skilled in the art will appreciate on the basis of the description given above that the functional units may be composed in another way while still allowing the functionality of the identification module.

In principle, the inventive concept introduces the idea to use the transponder memory 220 of the radio frequency identification (RFID) transponder module 200 as a local buffer memory for temporary storing data, which is to be transmitted via the radio frequency (RF) interface (I/F) 235. In particular, the transponder memory 220 for temporary storing data should be operated in the manner of a first-in-first-Out buffer and ring buffer, respectively.

As described above, the transponder logic 210 supplies data being stored in the transponder memory 220 to the radio frequency (RF) interface (I/F) 235, where the data is modulated onto an adequate carrier wave. The modulated carrier wave carrying the data is emitted by the antenna 230, wherein the modulated carrier wave may be detected by a corresponding radio frequency identification (RFID) reader. The amount of data being finally transmitted via the transponder antenna 230 is limited by the physical capacity of the transponder memory 220.

Referring to the aforementioned inventive concept, the transponder memory 220 used as local buffer memory for temporary storing data enables the overcoming of the capacity limitation mentioned above. Assuming that the radio frequency identification (RFID) transponder module 200 according to the present invention emits a modulated carrier wave carrying data. The transponder logic 210 supplies accordingly data read-out from the transponder memory 220 to the radio frequency (RF) interface (I/F) 235. This means, the transponder logic 210 streams (data stream 250) continuously data to the radio frequency (RF) interface (I/F) 235. In parallel to the streaming of the data to the radio frequency (RF) interface (I/F) 235, the transponder logic 210 receives a data stream (indicated by data connection 300 and data stream 240, respectively) from the portable consumer electronic (CE) device 100, which is coupled via the data interface (I/F) 215 to the radio frequency identification (RFID) transponder module 200. Due to the fact that the transponder memory 220 is used as buffer memory and as soon as data has been read-out and supplied to the radio frequency (RF) interface (I/F) 235, this read-out data is not required any more. This means that the one or more storage positions, at which this data had been stored before read-out, may be now used to store other (newly received) data. This feature enables to store continuously data of the data stream received from the portable consumer electronic (CE) device 100 via the data interface (I/F) 215 in the transponder memory 220 and to supply in parallel and continuously data stored in the transponder memory 220 to the radio frequency (RF) interface (I/F) 235 for being emitted by the antenna 230.

Figure 2C:
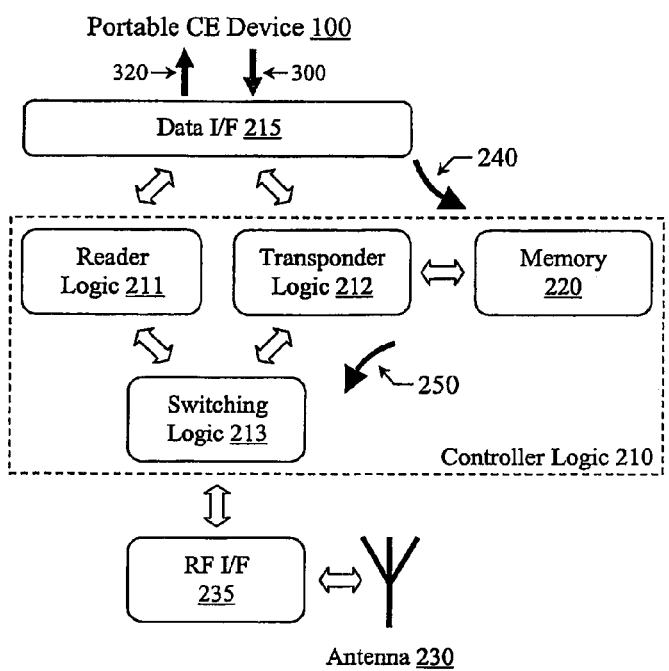
FIG. 2c illustrates schematically an implementation of an alternative RFID module according to an embodiment of the present invention.

FIG. 2c shows a diagram of functional blocks, on the basis of which a RFID module with transponder functionality and reader functionality is realizable. The schematically illustrated radio frequency identification (RFID) module includes a radio frequency identification (RFID) reader logic 211, which shall represent the radio frequency identification (RFID) reader functionality, and a radio frequency identification (RFID) transponder logic 212, which shall represent the radio frequency identification (RFID) transponder functionality. Both functional logic units, i.e. the radio frequency identification (RFID) reader logic 211 as well as the radio frequency identification (RFID) transponder logic 212, require a radio frequency (RF) interface (I/F) 235 and an antenna 230 adapted to the radio frequency (RF) deployed for operating. The embodiment illustrated in FIG. 2c purposes to use a common radio frequency (RF) interface (I/F) 235 and a common antenna 230 for operability with both functional logic units. It shall be understood that the radio frequency (RF) interface (I/F) 235 as well as the antenna 230, which are presented in the present description according to embodiment of the invention, are adapted to employ any suitable radio frequency or radio frequencies used in the field of radio frequency identification (RFID) technology. In particular, at least typical operation frequencies as aforementioned shall be applicable with the illustrated embodiment of the present invention.

In case of radio frequency identification (RFID) reader functionality, the antenna 230 is adapted to emit one or more interrogation signals and to receive one or more response signals for retrieving information from any radio frequency identification (RFID) transponder.

In case of radio frequency identification (RFID) transponder functionality, the antenna 230 is adequate to receive one or more interrogation signals and to emit one or more response signals carrying information retrieved from the interrogated radio frequency identification (RFID) transponder logic 212 and transponder memory 220 thereof, respectively.

The antenna 230 is connected to the radio frequency (RF) interface (I/F) 235 via one or more signal connections, which supply radio frequency (RF) signals generated by the radio frequency (RF) interface (I/F) 235 to the antenna 236 and which accepts radio frequency (RF) signals received by the antenna 230.

The radio frequency (RF) interface (I/F) 235 is responsible for both modulating and demodulating the signals to be transmitted and received by the antenna 230, respectively. Therefore, the radio frequency (RF) interface (I/F) 235 couples to the radio frequency identification (RFID) reader logic 211 and the radio frequency identification (RFID) transponder logic 212, respectively. In particular, the radio frequency (RF) interface (I/F) 235 receives from the radio frequency identification (RFID) reader logic 211 signals to be modulated and transmitted and transmits demodulated signals to radio frequency identification (RFID) reader logic 211. Additional, the radio frequency (RF) interface (I/F) 235 also transmits demodulated signals to the radio frequency identification (RFID) transponder logic 211 and receives signals from the radio frequency identification (RFID) transponder logic 211 to be modulated and transmitted. More particularly, the radio frequency (RF) interface provides further signals necessary for the operation of the radio frequency identification (RFID) transponder logic 211, which are in detail a power supply signal (voltage signal) and a clock signal. The power supply signal is gained from the coupling of the interrogating electromagnetic field, whereas the clock signal is obtained from the demodulator comprised by the radio frequency (RF) interface (I/F) 235. The power supply signal and the clock signal may obligate for operating the radio frequency identification (RFID) transponder logic 212, respectively, especially in case the illustrated radio frequency identification (RFID) module shall simulate a passive radio frequency identification (RFID) transponder energized by an interrogating signal of an eternal radio frequency identification (RFID) reader device.

The radio frequency identification (RFID) module illustrated in FIG. 2c comprises moreover a switching logic 213, which is operable to switch between radio frequency identification (RFID) reader functionality and radio frequency identification (RFID) transponder functionality. The switching logic 213 is functionally interposed between radio frequency identification (RFID) reader logic 211, radio frequency identification (RFID) transponder logic 212 and radio frequency (RF) interface (I/F) 235 and the switching logic 213 is operable with a switching input being supplied with a switching signal generated by the portable consumer electronic (CE) device 100. In detail, the switching logic 213 is operable to couple either the radio frequency identification (RFID) reader logic 211 to the radio frequency (RF) interface (I/F) 235 or the radio frequency identification (RFID) transponder logic 212 to the radio frequency (RF) interface (I/F) 235. Correspondingly in dependence on the switching state and position of the switching logic 213, respectively, radio frequency identification (RFID) reader functionality or radio frequency identification (RFID) transponder functionality is operable with the radio frequency identification (RFID) module.

The radio frequency identification (RFID) module and hence the radio frequency identification (RFID) reader logic 211 is provided with an data interface (I/F) 215 to allow an application, which is run on the portable consumer electronic (CE) device for communication with the radio frequency identification (RFID) module and in particular with radio frequency identification (RFID) reader logic 211 via data connections 300 and 320. The data interface (I/F) 215 interfacing between radio frequency identification (RFID) module and the portable consumer electronic (CE) device is established by appropriate hardware and software interfaces that allow communication with the radio frequency identification (RFID) reader logic 211.

The implemented radio frequency identification (RFID) reader logic 211 allows for radio frequency identification (RFID) reader functionality as described above. Additionally, the radio frequency identification (RFID) reader logic 211 may be adapted for radio frequency identification (RFID) writer functionality. In detail, a radio frequency identification (RFID) reader with reader functionality is adapted to retrieve information stored in one or more RFID transponders. The reader functionality is at least the basic functionality of a radio frequency identification (RFID) reader. A radio frequency identification (RFID) reader with writer functionality is adapted to add data to radio frequency identification (RFID) transponders to be stored therein and/or modify data stored in radio frequency identification (RFID) transponders. It shall be noted that the adding and/or modifying of data stored in RFID transponders depends on the capability of the radio frequency identification (RFID) transponders and/or authorization of the radio frequency identification (RFID) reader. The writer functionality is an enhanced functionality of a radio frequency identification (RFID) reader.

In addition, the data communication standard called near field communication (NFC) which is based on radio frequency identification (RFID) technology has been introduced to improve radio frequency identification (RFID) communication technology. The near field communication standard (ECMA-340) addresses specifically the operation of radio frequency identification (RFID) readers and defines particularly an active communication mode, which is used preferably for radio frequency identification (RFID) reader-to-reader communications, and a passive communication mode, which is preferably intended for radio frequency identification (RFID) reader-to-transponder communications. Both the active and passive communication modes require necessarily energizing of the communicating radio frequency identification (RFID) reader via a power supply. In case of the active communication mode the necessity of a power supply is obvious since communication is activated and preferably energized by the radio frequency identification (RFID) reader.

The radio frequency identification (RFID) transponder functionality as described above may be employed to establish a communication mode, which shall be denoted as show communication mode. In the show communication mode the radio frequency identification (RFID) transponder functionality is switched while the radio frequency identification (RFID) reader functionality is switched-off, i.e. is out of operation. The show communication mode is distinguished from the known communication modes such that the radio frequency identification (RFID) transponder functionality provides the physical advantage of passive radio frequency identification (RFID) transponders, which in particular do not require any internal power supply. The illustrated show communication mode primarily takes the requirement into account to provide for radio frequency identification (RFID) transponder functionality even in case the radio frequency identification (RFID) module is not energized by an external/internal power supply but energized by an interrogating signal, which can only server for a limited power supply.

Data stored in the radio frequency identification (RFID) module, which can be retrieved by a radio frequency identification (RFID) reader as illustrated above, is stored in an adequate storage component such as a transponder memory 220. The storage component is preferably a configurable storage component. A broad number of storage technologies are applicable for implementing configurable storage components and in particular non-volatile configurable storage technologies are of interest.

The radio frequency identification (RFID) module and hence the radio frequency identification (RFID) transponder logic 212 may be provided with the data interface (I/F) 215 to allow an application, which is run on the portable consumer electronic (CE) device 100 for supplying data to the radio frequency identification (RFID) module and in particular to radio frequency identification (RFID) transponder logic 212 with the transponder memory 220. The data interface (I/F) 215 interfacing between radio frequency identification (RFID) module and the portable consumer electronic (CE) device 100 is established by appropriate hardware and software interfaces that allow communication with the radio frequency identification (RFID) transponder logic 212 and transponder memory 220.

In analogy to FIG. 2b, it shall be assumed that the RFID module as embodied in FIG. 2c is attached to or embedded in a portable consumer electronic (CE) device 100. Conventionally, the radio frequency identification (RFID) module may be provided with an data interface (I/F) such as a serial and/or parallel data bus interface interfacing data between the radio frequency identification (RFID) module and the portable consumer electronic (CE) device 100 such that applications executable on the portable consumer electronic (CE) device 100 can take advantage of the functionality, which is provided by the radio frequency identification (RFID) module, especially the show communication mode. An application program interface (API) layer may support the communication between applications operable with the portable consumer electronic (CE) device 100 and the radio frequency identification (RFID) module.

In accordance with the inventive concept illustrated with reference to FIGS. 2a and 2b, the transponder memory 220 of the radio frequency identification (RFID) module 200 embodied in FIG. 2c is analogously applicable as a local buffer memory for temporary storing data, which is to be transmitted via the radio frequency (RF) interface (I/F) 235. In particular, the transponder memory 220 for temporary storing data should be operated in the manner of a first-in-first-Out buffer and ring buffer, respectively. As described above, the transponder logic 212 supplies data, which is stored in the transponder memory 220, to the radio frequency (RF) interface (I/F) 235, where the data is modulated onto an adequate carrier wave. The modulated carrier wave carrying the data is emitted by the antenna 230, wherein the modulated carrier wave may be detected by a corresponding radio frequency identification (RFID) reader. The amount of data being finally transmitted via the transponder antenna 230 is limited by the physical capacity of the transponder memory 220.

Referring to the aforementioned inventive concept, the transponder memory 220 used as local buffer memory for temporary storing data enables to overcome capacity limitation mentioned above. Assuming that the radio frequency identification (RFID) module according to an embodiment of the present invention emits a modulated carrier wave carrying data. The transponder logic 210 supplies accordingly data read-out from the transponder memory 220 to the radio frequency (RF) interface (I/F) 235. This means, the transponder logic 212 streams (data stream 250) continuously data to the radio frequency (RF) interface (I/F) 235. In parallel to the streaming of the data to the radio frequency (RF) interface (I/F) 235, the transponder logic 212 receives a data stream (data streams 300 and 240) from the portable consumer electronic (CE) device 100, which is coupled via the data interface (I/F) 215 to the radio frequency identification (RFID) module. Due to the fact that the transponder memory 220 is used as buffer memory and as soon as data has been read-out and supplied to the radio frequency (RF) interface (I/F) 235, this read-out data is not required any more. This means that the one or more storage positions, at which this data had been stored before read-out, may be now used to store other (newly received) data. Consequently, this feature enables to store continuously data of the data stream received from the portable consumer electronic (CE) device 100 via the data interface (I/F) 215 in the transponder memory 220 and to supply in parallel and continuously data stored in the transponder memory 220 to the radio frequency (RF) interface (I/F) 235 for being emitted by the antenna 230.

Figure 3:
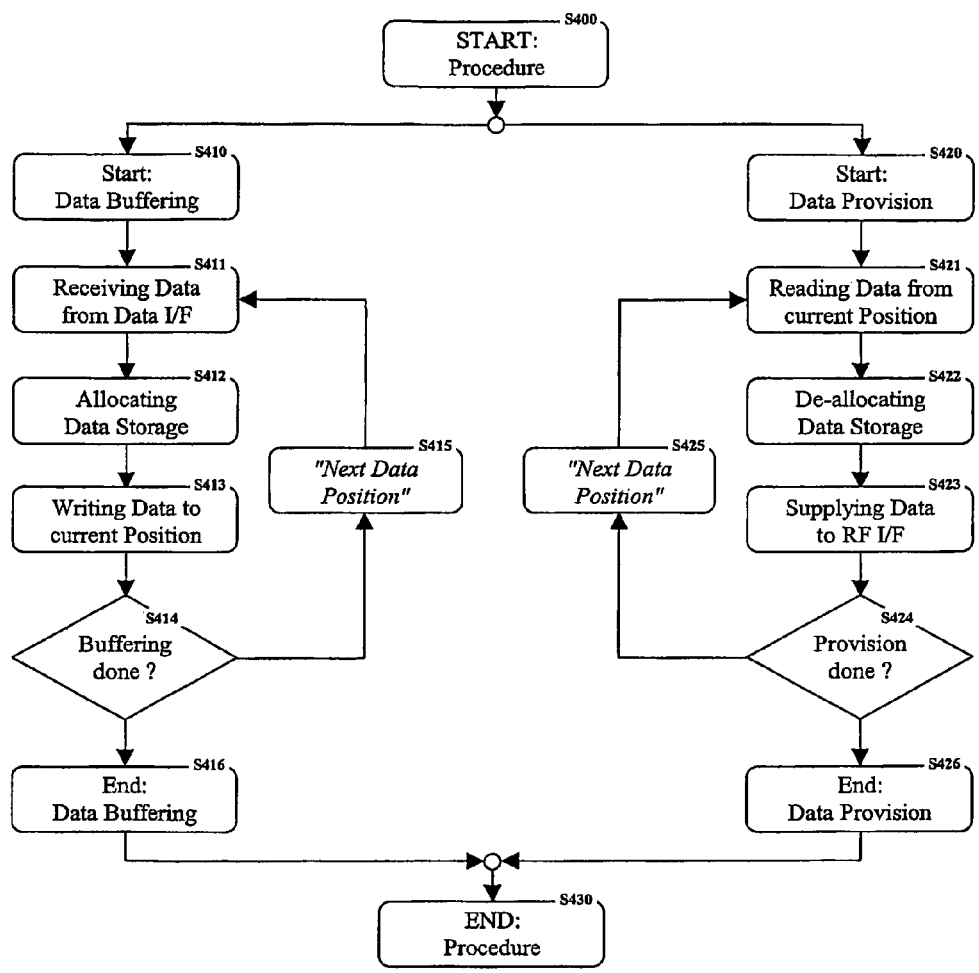
FIG. 3 depicts schematically a flow diagram comprising operation steps for illustration according to an embodiment of the present invention.

FIG. 3 illustrates one possible operational sequence, which enables the operation of a radio frequency identification (RFID) transponder and radio frequency identification (RFID) module enlightened briefly above according to an embodiment of the invention.

In an operation S400, the operational procedure of the radio frequency identification (RFID) transponder such as radio frequency identification (RFID) transponder module 200 begins. The operational procedure according to the illustrated embodiment is constituted of two operational subprocedures, one of which relates to the aforementioned storing of a data stream originating from the external electronic device and the other one of which relates to the aforementioned supplying of a data steam to the radio frequency (RF) interface (I/F). The operational subprocedures may be operated substantially independent and in parallel, but are performed in coordination/cooperation with each other.

The first operational subprocedure comprises the operations S410 to S416 according to an embodiment of the present invention, whereas the second operational subprocedure comprises the operations S420 to S426 according to the embodiment of the present invention In an operation S410, the buffering of data is started. The data shall be received in form of a data stream via the data interface (I/F) from an electronic device providing the data of the data stream. In an operation S411, data is received via the data interface (I/F) for being stored in the transponder memory. In an operation S412, data storage area with sufficient data storage capacity is allocated in the transponder memory. In an operation S413, the received data is written to the allocated data storage of the transponder memory. The allocation of the data storage area shall protect the allocated data storage area against unauthorized write access. The sufficient data storage capacity is defined by the amount of data to be stored/written.

In an operation S414, it is checked whether the data buffering is finished. For example, the end of the data buffering subprocedure may be detected on receiving a specific data sequence indicating that all data to be buffered has been received previously or alternatively, on interruption of the data stream.

In case the data buffering is not finished, the operational sequence will branch to an operation S415 and return subsequently to the operation S411 in order to handle further data accordingly. In the operation S415, the further data originating from the external electronic device received via the data interface (I/F) will be stored in a next data storage area in the transponder memory, which is not allocated by the data buffering subprocedure up to now. That means that following allocation operation will allocate a data storage area with sufficient data capacity, which is unused and free up to now, respectively.

In case the data buffering is finished, the operational sequence continues with operation S416.

In the operation S416, the buffering of data according to an embodiment of the present invention is completed.

In an operation S420, the data provision via the radio frequency (RF) interface (I/F) is started.

In an operation S421, data is read out from a current data storage area of the transponder memory, which has been allocated by the data buffering subprocedure before. In an operation S422, the data storage area, which contains the read-out data, is de-allocated such that the de-allocated data storage area is free again for storing other data, in particular other data in accordance with the data buffering procedure described above. In an operation S423, the read-out data is supplied to the radio frequency (RF) interface (I/F) to be provided via the antenna to an external data acquiring entity such as a radio frequency identification (RFID) reader.

In an operation S424, it is checked whether the data provision is finished. In particular, the data provision is finished in case all data stored in the transponder memory has been provided via the radio frequency (RF) interface (I/F) and the antenna.

In case the data provision is not finished, the operational sequence will branch to an operation S425 and return subsequently to the operation S421 in order to handle further data accordingly. In the operation S425, the further data to be supplied to the radio frequency interface (I/F) will be read out from a next data storage area in the transponder memory, to which data has been stored previously by the data buffering subprocedure. This means, following read operation will access a data storage area, which has been reserved and allocated for storing data, respectively.

Those skilled in the art will appreciate on the basis of the description, that the next data position for reading access to the transponder memory is predefined by the sequence for allocation of storage areas during the data buffering subprocedure. The sequence in which the data is received via the data interface has to be maintained; i.e. the data sequence observable at the data interface shall also be observable at the radio frequency interface and antenna, respectively.

In case the data provision is finished, the operational sequence continues with an operation S426.

The start of the data buffering subprocedure and the data provision subprocedure may be shifted in time. Due to the fact that the data, which the data provision subprocedure accesses for reading, has to be stored previously by the data buffering subprocedure, a start of the data provision subprocedure delayed in time relative to the start of the data buffering subprocedure ensures that the data provision subprocedure accesses valid data. The end of the data provision subprocedure is correspondingly delayed in time relative to the end of the data buffering subprocedure.

In the operation S426, the operational procedure of the radio frequency identification (RFID) transponder according to an embodiment of the present invention is finished in case the operational subprocedures have both reached the operations S416 and S426, each indicating that the individual subprocedures have been completed successfully.

Those skilled in the art will appreciate that the illustrated operational subprocedures can be performed substantially independent from each other but the operation of the individual subprocedures require coordination with each other. The term in coordination with each other shall indicate that the allocation and de-allocation operations included in the data buffering and data provision subprocedures, respectively, coordinate the usage of the transponder memory to prevent unwanted collisions and conflicts due to the reading and writing access to storage areas of the transponder memories. The allocation and de-allocation operations ensure that the data buffering subprocedure is prevented from using data storage areas comprising data for data storing, which data is not supplied to the radio frequency (RF) interface (I/F) previously.

Hence, the data buffering and data provision subprocedures are operated substantially in parallel or in alternation. An operation of the data buffering and data provision subprocedures substantially in parallel have to take into consideration that a writing of data to a memory and a simultaneous reading of this data has conventionally to be prevented. During such simultaneous writing and reading data consistency has to be guaranteed for instance by shifting in time the reading and writing operations (relating to at least the same data storage position) or any other suitable precautions.

Independent for the operation being performed substantially in parallel or in alternation, overall data consistency has to be taken into account. Data received via the data interface has to be supplied to the radio frequency interface without loss of data and loss of data sequence, respectively. Correspondingly, timing requirements relating to the reception of the stream of data via the data interface and supplying of the stream of data to the radio frequency interface have to be observed.

In order to describe the operation of the illustrated radio frequency identification (RFID) transponder module 200 according to the present invention and the transponder logic 220 thereof, references will be made to FIG. 4a to FIG. 4e, which depict schematically operational sequences according to embodiments of the invention.

Figure 4A:
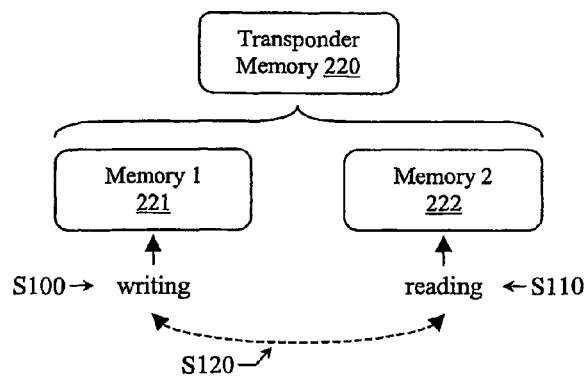
FIG. 4a illustrates schematically a structure and operativeness of a RFID transponder memory according to a first embodiment of the present invention.

Referring to FIG. 4a, the transponder memory may be partitioned logically and/or physically into two independent transponder memories, herein designated as memory 1 221 and memory 2 222. In accordance with the operational sequence illustrated with reference to FIG. 3, the memory 1 221 shall be associated with the data buffering subprocedure, whereas the memory 2 222 shall be associated with the data provision subprocedure. In consequence to the aforementioned associations, data received via the data interface (I/F) by the radio frequency identification (RFID) transponder module 200 is written to and stored in the memory 1 221 in an operation S100, respectively, whereas in an operation S110, data to be supplied to the radio frequency (RF) interface (I/F) is read out from the memory 2 222 and supplied thereto. Once the storage capacity of the memory 1 221 is allocated completely for storing data received via the data interface (I/F) and/or all data stored in the memory 2 222 is supplied to the radio frequency (RF) interface (I/F) and the memory 2 222 is de-allocated accordingly, the associations of the memories 1 221 and 2 222 are exchanged with each other in an operation S120. This means that the memory 1 221 is associated with the data provision subprocedure and the memory 2 222 is associated with the data buffering subprocedure. Subsequently to the new associations, the operations according to the data buffering and the data provision subprocedure can be continued, respectively.

Figure 4B:
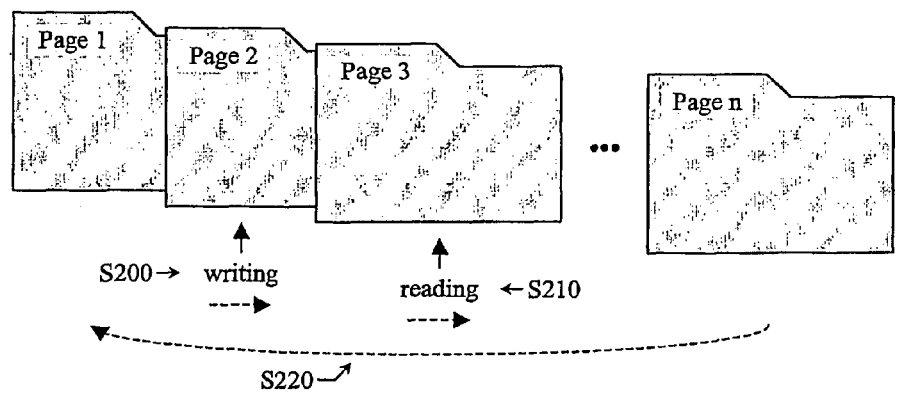
FIG. 4b illustrates schematically a structure and operativeness of a RFID transponder memory according to a second embodiment of the present invention.

Referring to FIG. 4b, the transponder memory may be partitioned logically and/or physically into several independent transponder memories, herein designated as memory pages 1 to n. It shall be assumed that memory page 2 is currently associated with the data buffering subprocedure and memory page 3 is currently associated with the data provision subprocedure.

In consequence to the aforementioned associations and with reference to the operational sequence illustrated above, data received via the data interface (I/F) by the radio frequency identification (RFID) transponder module 200 is written to and stored in the memory page 3 in an operation S210, respectively. In parallel, data to be supplied to the radio frequency (RF) interface (I/F) is read out from the memory page 2 and supplied thereto, in an operation S200.

Once the storage capacity of the memory page 3 is allocated completely for storing data received via the data interface (I/F) and/or all data stored in the memory page 2 is supplied to the radio frequency (RF) interface (I/F), the associations of the memory pages shift "forward". This means that a next memory page including data to be supplied to the radio frequency (RF) interface (I/F) will be associated with the data provision subprocedure, i.e. for instance memory page 3 herein, and a available and free memory page will be associated with the data buffering subprocedure, i.e. for instance the following memory page 4 herein. Moreover, memory page 2, which has been read-out during the aforementioned operation S200, is de-allocated and available for the data buffering subprocedure as aforementioned.

With reference to FIG. 4b, the example illustrates a subsequent utilization of the memory pages with increasing page numbers. The data buffering subprocedure starts with memory page 1 for writing data thereto, which is received via the data interface (I/F) and selects subsequently the following memory pages by increasing the memory page number. As soon as, the maximum memory page number is reached, i.e. memory page number n herein, the data buffering subprocedure returns to memory page 1. Accordingly, the data provision subprocedure follows the memory allocation of the data buffering subprocedure. This means that the data provision subprocedure starts also with memory page 1 for reading-out data to be supplied to the radio frequency (RF) interface (I/F) and continues with the next memory page by increasing analogously the memory page number. After having read-out the last memory page, i.e. memory page n herein, the data provision subprocedure returns likewise to memory page 1. Finally, the data provision subprocedure ends correspondingly at the last storage position, which has been allocated by the data buffering subprocedure and which represents the last storage position comprising valid data.

Referring to FIG. 4c to 4e, the transponder memory may be partitioned logically and/or physically into several independent transponder memory cells, herein designated as memory cell 1 to n. Whereas a memory page usually provide storage capacity for any predetermined amount of data, a storage cell may designate a smallest data storage unit, such as a byte, a word with 8 bit, sixteen bit and thirty-two bits, respectively, or the like. The data storage unit is usually predetermined by the logical and/or physical structure or organization of the memory and/or the logic controlling and accessing the memory.

With reference to FIG. 4c, it shall be assumed that memory cells 1 to 6 have been allocated before by the data buffering subprocedure and the memory cells 1 to 6 store data for the data provision subprocedure. Additionally, it shall be assumed that the memory cells 1 to 3 have been read-out and the data of memory cells 1 to 3 have been supplied to the radio frequency (RF) interface (I/F). Accordingly, the memory cells 1 to 3 have also been de-allocated by the data provision subprocedure.

At the present moment, which is illustrated in FIG. 4c, memory cell 7 is allocated and data is written thereto in an operation S300. As indicated in FIG. 4c, the data buffering subprocedure will continue with memory cell 8. In parallel, the data stored in memory cell 4 is read-out, supplied to the radio frequency (RF) interface (I/F) and the memory cell 4 is de-allocated. Also indicated in FIG. 4c, the data provision subprocedure follows the sequence of writing/allocating operation of the data buffering subprocedure and will consequently continue with memory cell 5. The data provision subprocedure follows the data buffering subprocedure with a predetermined memory cell offset to ensure that the data read-out in accordance with the data provision subprocedure is valid. For the way of illustration, the predetermined offset $\Delta$ is herein selected to be two memory cells.

With reference to FIG. 4d, the data buffering subprocedure has reached memory cell n, which shall be assumed herein as the last memory cell of the transponder memory. In accordance with the operational sequence according to the embodiment of the present invention described with reference to FIG. 3, the memory cell n is allocated for storing data and the data received via the data interface (I/F) is written thereto indicated as operation S310. As illustrated above with reference to FIG. 4c, the data provision subprocedure follows the data buffering subprocedure with the aforementioned predetermined offset of two memory cells indicated as operation S311. That means that the memory cell "n−(Δ+1)=n−3" is read-out and de-allocated, respectively, and the data thereof is supplied to the radio frequency (RF) interface (I/F).

In an operation S312, the data buffering subprocedure will continue with memory cell 1 for storing data, indicated as operation S313. The data provision subprocedure will continue with increasing cell number maintaining the predetermined memory cell offset correspondingly.

With reference to FIG. 4e, the data buffering subprocedure has reached memory cell 3 and the data provision subprocedure has correspondingly reached memory cell n. In detail, the memory cell 3 is allocated for storing data and the data received via the data interface (I/F) is written thereto indicated as operation S320. In parallel, the memory cell n is read-out and de-allocated, respectively, and the data thereof is supplied to the radio frequency (RF) interface (I/F), indicated as operation S321. In an operation S322, the data provision subprocedure will continue with memory cell 1, indicated as operation S323. As illustrated in FIG. 4e, the predetermined offset of 2 memory cells is still maintained.

With reference to FIG. 4b and FIG. 4c to FIG. 4e, the methodological similarities between the described operational sequences will become apparent for those skilled in the art when reading the description referring to the respective illustrations. The transponder memory is partitioned into a sequence of several portions. Memory portions are subsequently associated with the data buffering subprocedure, whereas the data provision subprocedure is associated subsequently with the memory portions in the sequence/order of the associations made in accordance with the data buffering subprocedure. A predetermined offset in the sequence/order of the memory portions between the memory portion associated with the data buffering subprocedure and associated with the data provision subprocedure in parallel guarantees that collisions and conflicts are prevented, which may appear due to the competing memory accesses (i.e. reading and writing accesses).

Overall, the illustrated operation of the transponder memory can be understood as a first-in-first-Out storing technique and a ring buffer technique, respectively. Those skilled in the art will appreciate on the basis of the invention described above with reference to embodiments that the enlightened inventive concept allows to realize a radio frequency identification (RFID) transponder with a virtual memory having a memory capacity beyond the physical memory capacity of the implemented transponder memory. The amount of data to be transmitted via the radio frequency identification (RFID) transponder according to an embodiment of the invention is no longer limited by the capacity of the physical transponder memory, which is actually effective to the state of the art transponders with configurable memory. On the contrary, the limitation of the virtual memory capacity is only determined by the capability and the capacity of the electronic device coupled to the radio frequency identification (RFID) transponder according to an embodiment of the present invention. For example, data to the transmitted via an inventive radio frequency identification (RFID) transponder may be stored in the electronic device; i.e. the memory capacity of the coupled electronic device determines the capacity of the virtual memory. Alternatively, the data to be transmitted via an inventive radio frequency identification (RFID) transponder may be for instance at least partly generated by the coupled electronic device during transmission; i.e. the memory capacity may become virtually infinite.

Even though the invention is described above with reference to embodiments according to the accompanying drawings, it is clear that the invention is not restricted thereto but it can be modified in several ways within the scope of the appended claims.

The invention claimed is:

1. Method for continuous data provision in a radio frequency identification device, comprising:
   receiving a stream of data via a data interface and storing said received data in a transponder memory;
   reading out said stored data from said transponder memory and supplying said read-out data to a radio frequency interface, separate from said data interface, for being transmitted via said radio frequency interface, and
   using said transponder memory, from which said data has been read-out previously, for storing other, new data which is received subsequently via said data interface.

2. Method according to claim 1, wherein said storing and said reading out operations substantially are performed simultaneously or in continuously repeated alternation.

3. Method according to claim 1, comprising:
   allocating at least partially said memory for storing said data; and
   de-allocating at least partially said allocated memory subsequent to reading out said stored data.

4. Method according to claim 1, wherein said transponder memory is partitioned into at least two memory areas, wherein one memory area is firstly operable with storing said data and another memory area is firstly operable with reading-out said data.

5. Method according to claim 1, wherein said transponder memory is operable as a buffer memory.

6. Method according to claim 1, wherein said reading out and supplying operations further comprise:
   reading out said data stored in an allocated memory in accordance with a reading position;
   supplying said read-out data to said radio frequency interface;
   de-allocating at least partially said allocated memory; and
   updating said reading position.

7. Method according to claim 6, wherein said receiving and storing operations further comprises:
   receiving said stream of data via said data interface from an electronic device;
   allocating at least partially said memory in accordance with a writing position, wherein said allocated memory is previously unallocated;
   writing said received data to said allocated memory area; and
   updating said writing position,
   wherein said reading position and said writing position differs.

8. Method according claim 7, wherein reading and said writing positions are spaced by a predetermined offset.

9. Method according to claim 1, wherein said read-out data is supplied to said radio frequency interface in a sequence, in which said data has been received previously.

10. Computer program product for executing a method for continuous data provision by a radio frequency identification transponder, comprising program code sections stored on a non-transitory machine-readable medium for carrying out the steps of claim 1, when said program product is run on a controller, processor-based device, a computer, a microprocessor based device, a terminal, a network device, a mobile terminal, or a mobile communication enabled terminal.

11. Radio frequency identification device with continuous data provision, comprising:
- a data interface operable with an electronic device, wherein said data interface is adapted to receive and provide a stream of data;
- a transponder memory adapted to store said received data; and
- a transponder logic which is adapted to read out said stored data from said transponder memory, to supply said read-out data to a radio frequency interface separate from said data interface, and to use said transponder memory, from which said data has been read-out previously, for storing other, new data, which is received subsequently via said data interface;
- wherein said radio frequency interface is adapted to receive said supplied read-out data and to transmit said data.

12. Device according to claim 11, wherein said transponder memory is operable as a buffer memory.

13. Device according to claim 11, wherein said transponder memory is partitioned into at least two memory areas, wherein one memory area is first operable with storing said data and another memory area is first operable with reading out said data.

14. Device according to claim 11, wherein said transponder memory is adapted to allocate said memory for storing said data and to de-allocate said allocated memory subsequent to reading out said data stored.

15. Device according to claim 11, wherein said transponder logic is adapted to supply said read-out data in a same sequence to said radio frequency interface, which sequence is observable at the data interface adapted to receive said data.

16. Device according to claim 11, wherein said radio frequency identification device is a radio frequency identification transponder or a radio frequency identification module with radio frequency identification reader functionality as well as radio frequency identification transponder functionality.

17. System comprising a radio frequency identification device and an electronic device,
- wherein said radio frequency identification device is a radio frequency identification device according to claim 11,
- wherein said electronic device supplied data to said radio frequency identification device and wherein said radio frequency identification device is operable under control of said electronic device.

* * * * *

UNITED STATES PATENT AND TRADEMARK OFFICE
CERTIFICATE OF CORRECTION

PATENT NO. : 8,225,014 B2
APPLICATION NO. : 10/592739
DATED : July 17, 2012
INVENTOR(S) : Kuhl Page 1 of 1

It is certified that error appears in the above-identified patent and that said Letters Patent is hereby corrected as shown below:

<u>On the Title page item [57] should read:</u>

The present invention relates to the field of short-range communication systems. In particular, the present invention relates to radio frequency identification transponders with fixed physical memory capacity having however a flexible virtual memory capacity allowing for providing amounts of data by the radio frequency identification transponders extending the fixed physical memory capacity. Accordingly, a method and a radio frequency identification transponder for continuous data provision by a radio frequency identification transponder is provided. A stream of data is received via a data interface for the transponder and the received data is stored in a transponder memory. Then the stored data is read out form the transponder memory and supplied to a radio frequency interface for being communicated therewith. Next, the memory, which is currently used for storing data, which has been read out previously, is provided afterwards for storing data being received subsequently via the data interface.

Signed and Sealed this
Nineteenth Day of March, 2013

Teresa Stanek Rea
*Acting Director of the United States Patent and Trademark Office*